United States Patent Office 3,278,437
Patented Oct. 11, 1966

3,278,437
LUBRICATING OIL COMPOSITIONS
Lyman E. Lorensen, Orinda, and James W. Beardmore, Walnut Creek, Calif., and Frederick M. Fowkes, North Adams, Mass., assignors to Shell Oil Company, New York, N.Y., a corporation of Delaware
No Drawing. Filed Jan. 27, 1964, Ser. No. 340,520
3 Claims. (Cl. 252—51.5)

This invention relates to non-ash forming lubricants which are highly detergent and corrosion resistant over a wide temperature range and which also possess excellent viscosity index properties and to the non-ash forming polymeric product capable of imparting these desired properties to the base lubricant.

It is known that certain polymers derived from a monomer mixture, one component of which is a polymerizable heterocyclic nitrogen-containing compound such as a vinylpyridine or a vinylpyrrolidone (the vinyl radical can be C-vinyl or N-vinyl) possess good detergent properties. The other component of this class of copolymers is a methacrylate ester and their mixtures. The nitrogen-containing portion of the copolymer imparts detergency whereas the ester portion imparts oil-solubility, and controls the pour point and viscosity index properties of the copolymer. In order to accomplish this, it has been necessary to blend three or more different $C_{1-18}$ alkyl methacrylate esters in formulating the copolymer as illustrated by U.S. Patents 2,889,282 and 2,957,854. This presents manufacturing difficulties and cost problems and, in addition, these copolymers still lack desired corrosion and wear inhibiting properties required of additives to meet present lubrication needs.

It has now been discovered that improved detergency, viscosity index, as well as corrosion inhibition can be imparted to copolymers of 5- and 6-membered heterocyclic nitrogen-containing compounds such as vinylpyridine or vinylpyrrolidone and an ester of an acrylic acid and high molecular weight alcohols derived from olefinic polymers in the molecular weight range of from 800 to 10,000, preferably between 1,200 and 5,000 molecular weight. Highly branched olefinic polymers are preferred although straight chain, or mixtures of straight chain and branched materials may be used.

The alcohols in the molecular weight range indicated can be derived from polyolefins e.g., polyisobutylene, polypropylene, polyethylene, polyisoamylene, or various petroleum stocks via known reactions such as the Oxo process, or be made in the final step of the polymerization process e.g., via the "Augbau" process or via a telomerization process. The conversion of the olefinic polymers to the alcohols by the Oxo process can be accomplished by any suitable means such as described in U.S. Patents 2,644,844, 2,811,567, 2,834,815, 2,288,244 and 3,007,973. A preferred method for forming the Oxo alcohols (A) is obtained by reacting unsaturated polyisobutylene (mol. wt. 1,200–5,000) with hydrogen and carbon monoxide in the presence of cobalt carbonyl-tributyl phosphine catalyst at between 150–200° C. and 1,500–3,000 p.s.i. for about 100–150 hours. Any aldehydes present are converted to the alcohols by reduction in the presence of lithium aluminum hydride in an oxygen-containing solvent such as tetrahydrofuran. The alcohol is recovered from the solvent, washed and dried.

The esters of an acrylic acid and the highly branched chain high molecular weight Oxo alcohol such as illustrated by example (A) are obtained by transesterification of $C_{1-4}$ alkyl acrylates such as methyl acrylate or methyl methacrylate and the desired Oxo alcohol such as alcohol (A). Esters useful in forming copolymers of the present invention can be represented by the formula

wherein R is hydrogen or a $C_{1-4}$ alkyl or aryl radical, preferably a $CH_3$-radical and R' is the residue of the Oxo alcohol derived from highly branched chain olefinic polymer in the molecular weight range of from 800 to 10,000, preferably between 1,200 and 5,000.

Esters of the above type can be formed by the method described, namely by reacting acids or their $C_{1-4}$ alkyl acrylate esters of column (X) with the Oxo alcohols of column (Y), both columns being listed below:

| Column (X) | Column (Y) |
|---|---|
| | (Oxo alcohols derived from unsaturated polymers) |
| (1) acrylic acid. | ($1_1$) polyisobutylene (MW 800). |
| (2) methacrylic acid. | ($2_1$) polyisobutylene (MW 1,200). |
| (3) α-ethacrylic acid. | ($3_1$) polyisobutylene (MW 5,000). |
| (4) α-phenyl acrylic acid. | ($4_1$) polyisobutylene (MW 10,000). |
| (5) methyl acrylate. | ($5_1$) polyisoamylene (MW 1,500). |
| (6) methyl methacrylate. | ($6_1$) polypropylene (MW 1,000). |
| (7) methyl α-ethacrylate. | ($7_1$) polypropylene-isobutylene (MW 2,000). |
| (8) methyl α-phenylacrylate. | ($8_1$) poly olefin petroleum feed (MW 2,500). |
| (9) ethyl methacrylate. | ($9_1$) polyethylene-polyisobutylene (MW 1,500). |
| (10) butyl methacrylate. | ($10_1$) polyisobutylene-polyisoamylene (MW 2,000). |
| | ($11_1$) copolyethylene propylene (MW 1,000). |
| | ($12_1$) polyethylene α-methylstyrene (MW 1,200). |
| | ($13_1$) poly 3-methylbutene (MW 1,200). |

Preferred esters are those formed by reacting: B=(5) and ($2_1$); (C)=(5) and ($3_1$); D=(6) and ($2_1$); E=(6) and ($3_1$); F=(6) and ($9_1$); G=(6) and ($13_1$); H=(7) and ($2_1$); I=(8) and ($5_1$); J=(2) and ($2_1$); K=(6) and ($6_1$).

Although mixtures of esters of the present invention are not required to form multi-functional copolymeric additives of the present invention as are required with related prior art copolymers referred to above, they may be used. Thus, with esters used to form the novel copolymers of the present invention only one ester such as represented by (B) or (C) or the like is required, and such copolymers not only impart oil solubility, but improve the viscosity index of the oil, but also unexpectedly increases the detergency and corrosion inhibiting properties of the copolymer. Thus, copolymers of the present invention obviate manufacturing and reaction problems presented by the prior art, but also form superior products.

The nitrogen-containing monomers used to form the copolymers of the present invention can be represented by the formula

where $R_1$ and $R_2$ can be hydrogen and/or alkyl radicals and R is a 5- or 6-membered heterocyclic nitrogen-containing ring and which contains one or more substituent hydrocarbon group(s). In the Formula II the vinyl radical can be attached to the nitrogen or to a carbon atom in the radical R. Examples of such vinyl derivatives include 2-vinylpyridine, 4-vinylpyridine, 2-methyl-5-vinylpyridine, 2-ethyl-5-vinylpyridine, 4-methyl-5-vinylpyridine, N-vinylpyrrolidone, 4-vinylpyrrolidone, and the like.

The copolymers of the present invention are made by polymerizing a nitrogen-containing monomer of Formula II with an ester of Formula I in the mol ratio of 1:10 to 10:1, preferably in the mol ratio of 1:3 to 4:1 respectively under polymerizing conditions as described in U.S. Patents 2,889,282 or 2,957,854 to obtain randomly distributed monomeric units in the copolymer and the copolymer varies in molecular weight from $5 \times 10^4$ to $3 \times 10^6$ as determined by the light scattering method and has a nitrogen content of from 0.20 to 3.5% wt. nitrogen in the end product. Thus, following the procedure of the above-mentioned patents the following copolymers of the present invention were prepared:

different nature. In the first place, mineral lubricating oils of various viscosities may be mentioned. Synthetic lubricating oils are also suitable, however, as well as lubricating oils containing fatty oils. The products can also be incorporated in lubricating greases.

The polymers can be added to the lubricant as produced or else as a concentrate obtained by mixing them with a little of a lubricating oil.

The polymers of this invention can be used in lubricating oils in amounts ranging from about 0.1% to about 5%

|  |  | I | II | III | IV | V | VI | VII | VIII | IX | X |
|---|---|---|---|---|---|---|---|---|---|---|---|
| R—C=CH (II)<br>\|   \|<br>R₁  R₂ | 2-methyl-5-vinyl pyridine, percent wt | 7.5 | 15.2 | 14.9 |  |  |  |  |  |  | 15 |
|  | 2-vinyl pyridine |  |  |  | 5 |  |  |  |  |  |  |
|  | 4-vinyl pyridine |  |  |  |  | 10 |  |  |  |  |  |
|  | N-vinyl pyrrolidone |  |  |  |  |  | 10 | 15 |  | 15 |  |
|  | 5-methyl-N-vinyl pyrrolidone |  |  |  |  |  |  |  | 10 |  |  |
| H₂C=C—COOR' (I) | B=(5)+(2₁), percent wt |  |  |  |  |  |  |  |  | 85 |  |
|  | C=(5)+(3₁) |  |  |  |  |  |  | 85 |  |  |  |
|  | D=(6)+(2₁) | 92.5 | 84.8 | 85.1 | 95 |  | 90 |  |  |  |  |
|  | E=(6)+(3₁) |  |  |  |  |  |  |  |  |  |  |
|  | F=(6)+(9₁) |  |  |  |  | 90 |  |  |  |  | 86 |
|  |  |  |  |  |  |  |  |  | 90 |  |  |
| Percent wt. Nitrogen in end product (copolymer) |  | 0.455 | 2.14 | 1.79 | 0.35 | 1.6 | 1.4 | 2.1 | 0.8 | 1.7 | 2.1 |
| Ratio of (I):(II) in end product |  | 1.93:1 | 1:231 | 1:287 | 1.8:1 | 1.9:1 | 2:1 | 1:1.7 | 2:1 | 1:1.8 | 1:1.9 |
| Mol. wt. (Light Scattering) |  | 3×10⁶ | 7.5×10⁶ | 2×10⁶ | 5×10⁶ | 4.5×10⁶ | 6×10⁶ | 6.5×10⁶ | 8×10⁶ | 8.5×10⁶ | 4.2×10⁶ |

Another embodiment of the present invention is to form block copolymers. These can be prepared by polymerizing one of the monomers such as (I) or (II) to the desired degree of polymerization and, subsequently, initiating, with the living homopolymer obtained, the polymerization of the other type of monomer. Another possibility is a method of preparation according to which homopolymers of Formula I and Formula II are coupled to each other. If then both the homopolymers have two reactive terminal groups, a block polymer with a variable number of blocks is formed; if one of the homopolymers has two reactive terminal groups and the other only one, a block polymer consisting of three blocks is formed.

Preparation of the block polymers by means of anionic polymerization is preferred. An alkali metal or an alkali metal compound of an hydrocarbon is then used as the initiator. If such an initiator and one of the monomers are combined, a polymer is formed of which one or either of the terminal groups is a carbanion, or, depending on the solvent aplied, a carbon-metal bond.

Suitable initators for the anionic polymerization are the metals sodium, potassium lithium, rubidium, cesium and their hydrocarbon compounds, for instance, sodium naphthalene, butyl lithium, Na₂ (alphamethyl styrene)₄, benzyl sodium and phenyl isopropyl potassium.

The solvent used can be tetrahydrofuran, benzene, hexane, dimethoxyethane and others.

The following example (XI) illustrates the method of preparaing block copolymers of the present invention.

To tetrahydrofuran containing as the initiator sodium α-methyl styrene tetramer was added 10% of 2-vinyl pyridine and the mixture was rapidly stirred and kept at −60° C. by cooling. To this ⁺Na⁻ (2-vinyl pyridine)₇ (α-methyl styrene)₄ (2-vinyl pyridine)₇⁻ Na⁻ polymer formed was added 90% of ester D=(6)+(1,) and addition solvent tetrahydrofuran added. The reaction mixture was stirred and at the end of about an hour terminated by addition of isopropanol. The reaction mixture was poured into a large volume of methanol from which the precipitated polymer was recovered by filtration. The block copolymer had a nitrogen content of 0.9–1.2% wt. and a structure:

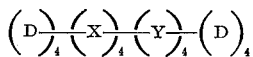

where D is the ester as defined, X is 2-vinyl pyridine and Y is α-methyl styrene.

The random and block polymers according to the invention are suitable for use as additives for lubricants of by weight, preferably from about 0.5% to about 3% by weight.

When desired, additional improvements with respect to oxidation stability and scuffing inhibition can be imparted to the oil compositions containing the polymer of this invention by incorporating small amounts (0.01%–2%, preferably 0.1%–1%) of phenolic antioxidants such as alkylphenols, e.g., 2,6-ditertbutyl-4-methylphenol or p,p'-methylene bisphenols such as 4,4'-methylene bis(2,6-ditertbutyl phenol) or arylamines such as phenyl-alpha-naphthylamine. Antiscuffing agents include organic phosphites, phosphates, phosphonates and their thio-derivatives, such as tri-($C_{3-18}$ alkyl phosphites), or phosphates, e.g., tributyl, octyl, lauryl, stearyl, cyclohexyl, benzyl, cresyl, phenol phosphites or phosphates, as well as their thio-derivatives, $P_2S_5$-terpene reaction products, e.g., $P_2S_5$-pine oil reaction products, e.g., $P_2S_5$-pine oil reaction products and alkali metal salts thereof such as potassium salt of a $P_2S_5$-terpene reaction product, phosphates such as dibutyl trichloromethanephosphonate, dibutyl monochloromethane phosphonate, and the like. The triphenyl, tricresyl and tristearyl ortho-phosphates or potassium salt of $P_2S_5$-terpene reaction product are preferred.

Lubricating oils for additives of this invention can be any natural or synthetic material having lubricating properties. Thus, the base may be a hydrocarbon oil of wide viscosity range, e.g., 100 SUS at 100° F. to 150 SUS at 210° F. The hydrocarbon oils may be blended synthetic lubricants such as polymerized olefins, organic esters of poly-basic organic and inorganic acids, e.g., di-2-ethylhexyl sebacate; polyalkyl silicone polymers, e.g., dimethyl silicone polymer, and the like. If desired, the synthetic lubricants may be used as the sole base lubricant.

Polymers of this invention can be also used in fuels, e.g., gasoline, fuel oils, lubricating oils, greases, asphalts and oil-water emulsions.

The following formulated compositions were tested in the manner described below:

Composition A=(mineral lubricating oil ¹+1.5% copolymer I)
Composition B=(mineral lubricating oil+1.5% copolymer III)
Composition C=(Composition A+0.75% bis(3,5-ditertbutyl-4-hydroxyphenyl)methane
Composition D=(Composition C+0.8% tricresyl phosphate+0.04% dicresyl phosphate)
Composition E=(Composition B+0.5% bis(3,5-ditertbutyl-4-hydroxyphenyl)methane ¹ Mineral lubricating oil=SAE 30.

Compositions of this invention were tested for their detergency and dispersancy properties by adding 0.02% carbon black to a test composition and suspending into said test oil at both ambient temperature and at 110° C. a strip of filter paper of set dimensions and observing the height and intensity of the carbon band formed on the filter paper. Compositions A, B, C, D, and E exhibited at both temperatures detergency effectiveness of 3 to 4 times that of compositions containing convention copolymers as described in U.S. Patent 2,889,282 or other types of polymers such as "Paratone 430" or "460" specifically such as compositions:

Compositions XX=mineral oil+2% 2-methyl-5-vinylpyridine/lauryl methacrylate/stearyl methacrylate
Compositions YY=mineral oil+2% "Paratone 430" copolymer
Compositions ZZ=mineral oil+same terpolymer of maleic anhydride/vinyl acetate $C_{16-18}$ alkyl furmarate Also in engine tests such as the LS-3 Cadillac engine test modified as follows: 100 hours, 400 repeating cycles of 15 minutes each, comprising 1 minute at 90° F. jacket temperature, 10 minutes at 135° F. jacket temperature, 2500 r.p.m. and 4 minutes at 190° F. jacket temperature at 3200 r.p.m.; operated on high sulfur fuel, Compositions A, C, D and E passed the 100 hour test and prevented oil ring-plugging, left oil rings clean and the engine was in excellent conditions whereas Compositions XX, YY and ZZ failed within 50–75 hours, especially with respect to ring-plugging.

Other additives may also be incorporated into the lubricating composition according to the invention, for example, anti-scuffing agents; anti-foaming agents, e.g., silicone polymers; viscosity index improvers, pour point depressants, extreme pressure additives such as, dibenzyl disulfide, rust inhibitors, such as sorbitan monoleate or butyl stearate; oiliness agents, such as acidless tallow, oleic acid and the like.

We claim as our invention:

1. A lubricating oil composition comprising a major amount of lubricating oil and a minor amount sufficient to impart detergency of an oil-soluble high molecular weight copolymer of a polymerizable heterocyclic nitrogen-containing compound selected from the group consisting of N-vinyl pyrrolidone and C-vinyl pyridine and an ester of a lower-alkyl acrylic acid and an Oxo alcohol of a highly branched-chain olefinic polymer in the molecular weight range of from 800 to 10,000 in the mole ratio of 1:10 to 10:1 respectively, the molecular weight of the copolymer ranging from $5\times10^4$ to $3\times10^6$.

2. A mineral lubricating oil composition comprising a major amount of mineral lubricating oil and from 0.1% to 5% of an oil-soluble copolymer of 2-methyl-5-vinylpyridine and an ester of methacrylic acid and an Oxo alcohol derived from polyisobutylene in the molecular weight range of from 1200 to 5000 in the mole ratio of 1:3 to 4:1 respectively, said copolymer having a molecular weight range of from $5\times10^4$ to $3\times10^6$.

3. A mineral lubricating oil composition comprising a major amount of mineral lubricating oil and from 0.1% to 5% of an oil-soluble copolymer of N-vinylpyrrolidone and an ester of methacrylic acid and an Oxo alcohol derived from polyisobutylene in the molcular weight range of from 1200 to 5000 in the mole ratio of 1:3 to 4:1 respectively, said copolymer having a molecular weight range of from $5\times10^4$ to $3\times10^6$.

References Cited by the Examiner
UNITED STATES PATENTS

| | | | |
|---|---|---|---|
| 2,564,726 | 8/1951 | Saner | 260—86.1 X |
| 2,827,359 | 3/1958 | Kine et al. | 260—86.1 X |
| 2,839,512 | 6/1958 | Barnum et al. | 260—86.1 |
| 2,889,282 | 6/1959 | Lorensen et al. | 252—51.5 |
| 2,892,786 | 6/1959 | Stewart et al. | 252—51.5 |
| 3,068,215 | 12/1962 | Laakso et al. | 260—86.1 X |
| 3,142,664 | 7/1964 | Bauer | 252—51.5 X |
| 3,145,195 | 8/1964 | Tsou | 260—86.1 |

DANIEL E. WYMAN, *Primary Examiner.*

P. P. GARVIN, *Assistant Examiner.*